United States Patent
Barbul et al.

(10) Patent No.: US 10,069,334 B2
(45) Date of Patent: Sep. 4, 2018

(54) FIELD NEUTRALIZATION DURING INDUCTIVE CHARGING

(71) Applicant: Bayerische Motoren Werke Aktiengesellschaft, Munich (DE)

(72) Inventors: Andreas Barbul, Munich (DE); Helmut Wagatha, Oberschleissheim (DE); Stefan Drozkowski, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 75 days.

(21) Appl. No.: 15/177,785

(22) Filed: Jun. 9, 2016

(65) Prior Publication Data
US 2016/0294216 A1 Oct. 6, 2016

Related U.S. Application Data

(63) Continuation of application No. PCT/EP2014/076715, filed on Dec. 5, 2014.

(30) Foreign Application Priority Data

Dec. 9, 2013 (DE) .................. 10 2013 225 241

(51) Int. Cl.
*H02J 50/00* (2016.01)
*B60L 11/18* (2006.01)
(Continued)

(52) U.S. Cl.
CPC ............. *H02J 50/00* (2016.02); *B60L 11/182* (2013.01); *H01F 7/064* (2013.01); *H01F 27/38* (2013.01);
(Continued)

(58) Field of Classification Search
CPC .. H02J 7/025; H02J 50/12; H02J 13/00; H02J 5/005; H02J 50/40; H02J 50/80; H02J 50/60; H02J 50/70
(Continued)

(56) References Cited

U.S. PATENT DOCUMENTS

2012/0050015 A1  3/2012 Low et al.
2012/0235636 A1* 9/2012 Partovi .................. H02J 7/025
                                                          320/108

(Continued)

FOREIGN PATENT DOCUMENTS

CN  102714429 A  10/2012
DE  39 36 547 A1  5/1991
(Continued)

OTHER PUBLICATIONS

German Search Report issued in counterpart German Application No. 10 2013 225 241.2 dated Apr. 17, 2014 with partial English translation (13 pages).
(Continued)

*Primary Examiner* — John Poos
(74) *Attorney, Agent, or Firm* — Crowell & Moring LLP

(57) ABSTRACT

A device and a corresponding method are provided for reducing an electromagnetic field in a vehicle. A control unit for a vehicle is designed to determine one or more properties of an electromagnetic interference field. The control unit is further designed to incite an emission unit in the vehicle to emit an opposing field which reduces a strength of the interference field in a first zone around and/or in the vehicle.

9 Claims, 3 Drawing Sheets

(51) Int. Cl.
*H01F 38/14* (2006.01)
*H01F 27/38* (2006.01)
*H01F 7/06* (2006.01)

(52) U.S. Cl.
CPC .......... *H01F 38/14* (2013.01); *Y02T 10/7005* (2013.01); *Y02T 10/7072* (2013.01); *Y02T 90/122* (2013.01); *Y02T 90/14* (2013.01)

(58) Field of Classification Search
USPC ........................................ 307/9.1, 10.6, 10.7
See application file for complete search history.

(56) References Cited

U.S. PATENT DOCUMENTS

| | | |
|---|---|---|
| 2012/0299538 A1 | 11/2012 | Arai et al. |
| 2013/0119774 A1 | 5/2013 | Ichikawa |
| 2015/0123465 A1 | 5/2015 | Ichikawa |

FOREIGN PATENT DOCUMENTS

| | | |
|---|---|---|
| DE | 197 13 449 A1 | 10/1998 |
| DE | 10 2009 053 985 A1 | 5/2011 |
| DE | 10 2011 084 942 A1 | 4/2013 |
| JP | 58-178636 A | 10/1983 |
| KR | 10-2011-0041173 A | 4/2011 |
| WO | WO 2011/046414 A2 | 4/2011 |
| WO | WO 2013/091875 A2 | 6/2013 |
| WO | WO 2013/103943 A1 | 7/2013 |
| WO | WO 2013/168242 A1 | 11/2013 |

OTHER PUBLICATIONS

Chinese-language Office Action issued in counterpart Chinese Application No. 201480067039.3 dated May 26, 2017 with English translation (15 pages).

International Search Report (PCT/ISA/210) issued in PCT Application No. PCT/EP2014/076715 dated Mar. 13, 2015 with English translation (five pages).

German-language Written Opinion (PCT/ISA/237) issued in PCT Application No. PCT/EP2014/076715 dated Mar. 13, 2015 (six pages).

* cited by examiner

FIELD NEUTRALIZATION DURING INDUCTIVE CHARGING

CROSS REFERENCE TO RELATED APPLICATIONS

This application is a continuation of PCT International Application No. PCT/EP2014/076715, filed Dec. 5, 2014, which claims priority under 35 U.S.C. § 119 from German Patent Application No. 10 2013 225 241.2, filed Dec. 9, 2013, the entire disclosures of which are herein expressly incorporated by reference.

BACKGROUND AND SUMMARY OF THE INVENTION

The invention relates to a device and a corresponding method for reducing an electromagnetic field, e.g. during the inductive charging of a vehicle.

Vehicles having an electric drive typically have a battery in which electrical energy for operating an electric machine of the vehicle can be stored. The battery of the vehicle can be charged with electrical energy from a power supply network. For this purpose, the battery is coupled to the power supply network in order to transfer the electrical energy from the power supply network into the battery of the vehicle. The coupling can be effected in a wired manner (via a charging cable) and/or wirelessly (on the basis of an inductive coupling between a charging station and the vehicle).

One approach for automatic, wireless, inductive charging of the battery of the vehicle consists in transferring the electrical energy to the battery from the ground to the underbody of the vehicle by means of magnetic induction via the underbody clearance 120. This is illustrated by way of example in FIG. 1. In particular, FIG. 1 shows a vehicle 100 having an energy store 103 for electrical energy (e.g. having a chargeable battery 103). The vehicle 100 includes a so-called secondary coil 102 in the vehicle underbody, wherein the secondary coil 102 is connected to the energy store 103 via an impedance matching (not shown) and a rectifier 101.

The secondary coil 102 can be positioned above a primary coil 111, wherein the primary coil 111 is fitted e.g. on the floor of a garage. The primary coil 111 is connected to a power supply 110. The power supply 110 can be a radiofrequency generator which generates an AC (alternating current) current in the primary coil 111, whereby a magnetic field is induced. Given sufficient magnetic coupling between primary coil 111 and secondary coil 102 via the underbody clearance 120, the magnetic field induces a corresponding voltage and thus also a current in the secondary coil 102. The induced current in the secondary coil 102 is rectified by the rectifier 101 and stored in the energy store 103 (e.g. in the battery). In this regard, electrical energy can be transferred wirelessly from the power supply 110 to the energy store 103 of the vehicle 100.

The AC current in the coils 111, 102 typically generates an electromagnetic field which can have an interfering effect on the environment. By way of example, the electromagnetic field can impair functions of the vehicle 100 or of neighboring vehicles 100. The present document addresses problem of neutralizing and/or reducing the electromagnetic field generated during inductive charging (e.g. compensating for it in specific regions). Moreover, the present document addresses the problem of reducing and possibly eliminating the influence of the electromagnetic field generated during inductive charging on specific functions of the vehicle 100 and/or of a neighboring vehicle.

The problem is solved by an apparatus and method in accordance with embodiments of the invention.

In accordance with one aspect, a control unit for a vehicle is described. The vehicle may be e.g. a double-track or a single-track vehicle. In particular, the vehicle may be an automobile, a truck or a motorcycle. The vehicle may include an electric machine which may be used to drive the vehicle. Furthermore, the vehicle may include an energy store for storing electrical energy. Moreover, the vehicle may have a charging coil which causes an electromagnetic interference field.

The control unit is designed to determine one or more properties of an electromagnetic interference field, caused in particular by inductive charging. However, the interference field may also be caused by other power electronics of the vehicle. The one or more properties of the interference field may include, in particular, a frequency of the interference field and/or one or more field strength values of the interference field at one or more locations around and/or in the vehicle. The frequency of the interference field may be in the LF range, i.e. in the long-wave range between 30 kHz and 300 kHz. The field strengths may decrease with increasing distance from the charging coil which generates the interference field.

The one or more properties of the interference field may be determined on the basis of measurement values which were detected e.g. by one or more sensors of the vehicle. Alternatively or supplementarily, the one or more properties may be predefined and be stored on a storage unit of the vehicle. This may be the case particularly if the interference field is generated by a charging coil (i.e. the secondary coil) of the vehicle. In other words, this is the case particularly if the interference field is generated by an inductive charging process of the vehicle. The control unit may then be designed to access the storage unit and thus to determine the one or more properties of the interference field.

The control unit is further designed to cause one or more transmitting units of the vehicle to emit an opposing field which reduces a field strength of the interference field in a first region around and/or in the vehicle. The opposing field may be determined and emitted in such a way that a destructive interference results from a superimposition of the opposing field with the interference field in the first region. The first region may include surroundings of the one or more transmitting units which directly adjoin the one or more transmitting units.

The interference field (at least in the first region) may be neutralized by the emission of an opposing field. This results in a reduction of the electromagnetic radiation in the first region. Furthermore, this has the effect that vehicle functions (e.g. an access function) the first region are not impaired by the interference field.

A transmitting unit may be a transmitting unit which is used in a dedicated manner for reducing and/or cancelling the interference field in the first region. Alternatively or supplementarily, recourse may be had to a transmitting unit which is already used in the vehicle for other vehicle functions (in particular for an access function to the vehicle). The vehicle may be designed to provide a "keyless" access function to the vehicle. The access function may be a function which enables a user to open a door of the vehicle without actuating a vehicle key. For this purpose, the access function may include an exchange of authentication signals between the vehicle and a vehicle-external authentication unit (e.g. the vehicle key).

The transmitting unit may be designed to transmit an authentication signal to the authentication unit. The interference field may interfere with the transmitted authentication signal and thereby impair the access function. The opposing field may neutralize the interference field in the first region, such that the exchange of authentication signals in the first region may proceed without interference, and the access function can thus function without interference.

The control unit may be designed to cause the transmitting unit to emit a superimposition of the opposing field and an authentication signal. In other words, the transmitting unit may be used both to neutralize the interference signal and to provide the access function. As a result, the interference signal may be neutralized in a cost-effective manner since recourse may be had to vehicle components already present.

The control unit may be designed to alter the opposing field in order to reduce the interference field in a second region around and/or in the vehicle. In this case, the second region may include at least one location around and/or in the vehicle which is not contained in the first region. By way of example, the control unit may be designed to cause the emission of an opposing field, such that the region with reduced field strength of the interference field follows the authentication unit, and an interference-free access function of the vehicle can be ensured at any arbitrary location around and/or in the vehicle.

The vehicle may have a multiplicity of transmitting units at different locations of the vehicle. Transmitting units may be arranged for example at the sides, in the front region and/or in the rear region of the vehicle. The opposing field for reducing the interference field in the first region may be generated by a plurality of transmitting units. Alternatively or supplementarily, the control unit may be designed to cause the multiplicity of transmitting units to emit a corresponding multiplicity of opposing fields which reduce the field strength of the interference field in a corresponding multiplicity of regions. The multiplicity of regions may be arranged at different locations of the vehicle in a manner corresponding to the multiplicity of transmitting units. In this regard, if appropriate, comprehensive neutralization of the interference field (e.g. at different points in time) may be made possible.

In accordance with a further aspect, a method for neutralizing an electromagnetic interference field caused by the inductive charging of a vehicle is described. The method includes determining one or more properties of the interference field. Furthermore, the method includes emitting an opposing field (e.g. by causing a transmitting unit of the vehicle to emit the opposing field) which reduces and/or cancels a field strength of the interference field in a first region around and/or in the vehicle.

In accordance with a further aspect, a software (SW) program is described. The SW program may be designed to be executed on a processor and thereby to perform the method described in this document.

In accordance with a further aspect, a storage medium is described. The storage medium may have stored thereon an SW program designed to be executed on a processor and thereby to perform the methods described in this document.

It should be taken into consideration that the methods, devices and systems described in this document can be used both by themselves and in combination with other methods, devices and systems described in this document. Furthermore, any aspects of the methods, devices and systems described in this document may be combined with one another in diverse ways.

Other objects, advantages and novel features of the present invention will become apparent from the following detailed description of one or more preferred embodiments when considered in conjunction with the accompanying drawings.

DETAILED DESCRIPTION OF THE DRAWINGS

As explained in the introduction, the present document is concerned with the neutralization or the (if appropriate local) reduction of an electromagnetic field generated by the inductive charging of a vehicle 100. The electromagnetic field may interfere with one or more functions of the vehicle 100. By way of example, the vehicle 100 may have a function which makes it possible to open a door of the vehicle 100 without actuating a vehicle key. Such a function is offered by various vehicle manufacturers under various brand names. By way of example, BMW offers such a function under the name "Comfort Access", in this document, a function which makes it possible to open a door of the vehicle 100 without actuating a vehicle key is referred to as an "access function".

Figure 1:
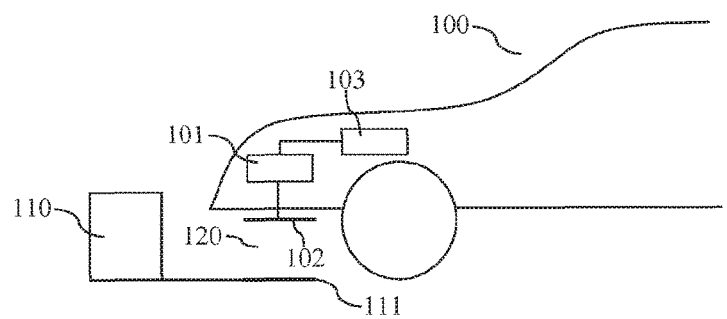
FIG. 1 shows an exemplary device for inductively charging a vehicle.
Figure 2:
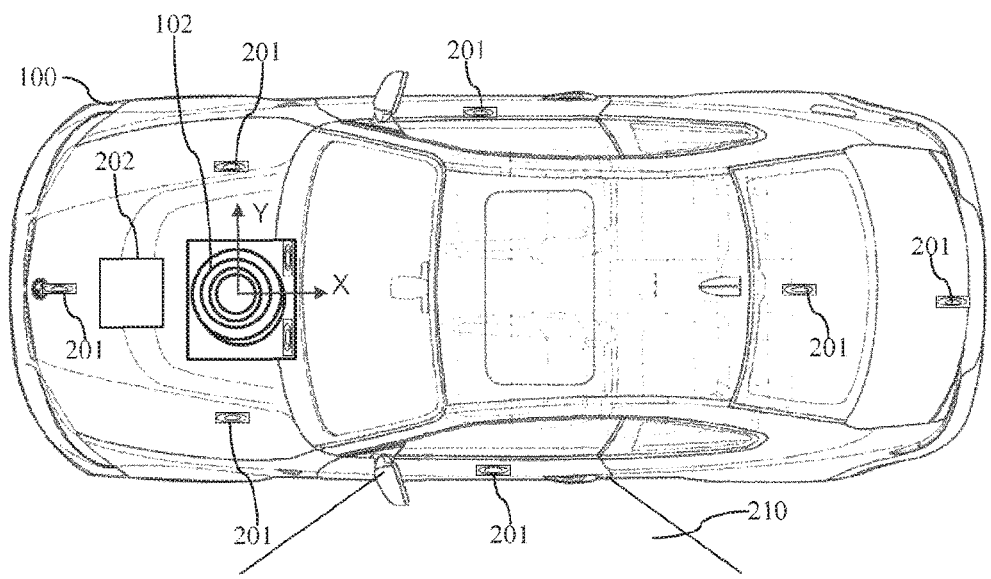
FIG. 2 shows an exemplary vehicle having a secondary coil and one or more transmitting units for communication with a vehicle key.

FIG. 2 shows a block diagram of a vehicle 100 having a multiplicity of transmitting units 201. The transmitting units 201 may be used for providing an access function to the vehicle 100. The vehicle 100 further has a secondary coil 102, which may be used for inductively charging a battery 103 of the vehicle 100. The vehicle 100 further includes a control unit 202 (e.g. a controller of the vehicle 100 for the inductive charging) designed to control the secondary coil 102 and/or the multiplicity of transmitting units 201.

The transmitting units 201 may be designed to emit an electromagnetic field (in particular in the LF, low frequency, range). Exemplary transmission frequencies of a transmitting unit 201 are in the range of 20-130 kHz. The control unit 202 may be designed to emit an enquiry signal (also referred to as an authentication signal in this document) via, one or more of the transmitting units 201 as soon as actuation of a handle of a door of the vehicle 100 is identified. The enquiry signal may be emitted in the LF range. A vehicle key may receive the enquiry signal, evaluate it and, if appropriate, transmit a response signal to the vehicle 100. The vehicle key may comprise for example an RFID (radiofrequency identifier) transponder. The vehicle 100 may have, e.g. as part of the transmitting units 201, receiving units designed to receive the response signal from the vehicle key. The control unit 202 may be designed to evaluate (e.g. to authenticate) the response signal and to instigate, if appropriate, opening of the door of the vehicle 100.

The one or more transmitting units 201 may emit the enquiry signal in a frequency range that is interfered with by the electromagnetic field generated by the charging coils (primary coil 111 and secondary coil 102). By way of example, frequencies in the range of 90-140 kHz (i.e.

likewise in the LF range) may be used for the inductive charging. These frequencies are in the vicinity of and/or overlap the abovementioned frequency range for emission of the enquiry signal. Interference with the access function of the vehicle 100 by the electromagnetic field generated by the charging coils 111, 102 may thus occur. The present document describes a method and a corresponding device by which the interference for the access function of the vehicle 100 may be reduced and/or eliminated.

As explained above, the access function of the vehicle 100 uses a specific number of transmitting coils 201 which generate an LF field which is measured by a 3D coil (or three individual coils) in the vehicle access key. The distance between the vehicle key and a transmitting coil 201 may be determined from the measurement of the LF field. The current key position may be determined on the basis of a plurality of transmitting coils 201 in the vehicle. In particular, the fact of whether the key is situated outside or inside the vehicle 100 may be determined from this. This information may be used to enable or to prevent functions of the vehicle 100. By way of example, the starting of an engine of the vehicle 100 may be made possible only if the vehicle key is situated in the vehicle 100 and/or the opening of a vehicle door may be made possible only if the distance between transmitting coil 201 and vehicle key is less than or equal to a predefined threshold value.

The transmitting coils 201 may be designed to emit signals with different frequencies. In particular, the control unit 202 (e.g. a microcontroller of the control unit 202) may be designed to drive the transmitting coils 201 with one or more specific frequencies. A VCO (voltage controlled oscillator), for example, may be used for generating different transmission frequencies.

Figure 3A:
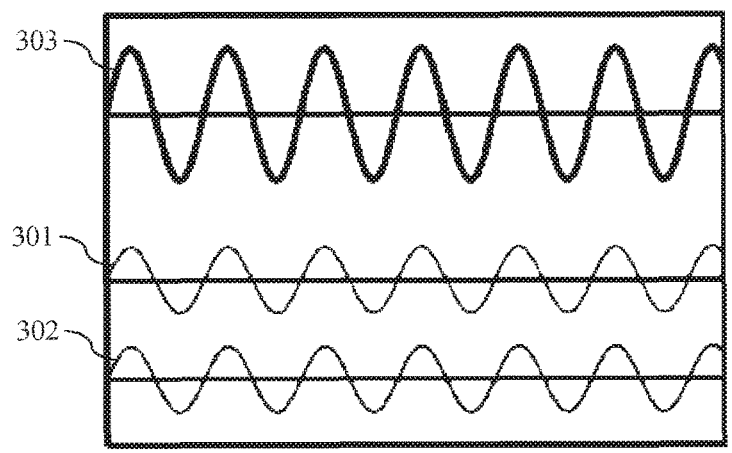
FIGS. 3a, 3b and 3c show exemplary waves and the superimpositions resulting therefrom.
Figure 3B:
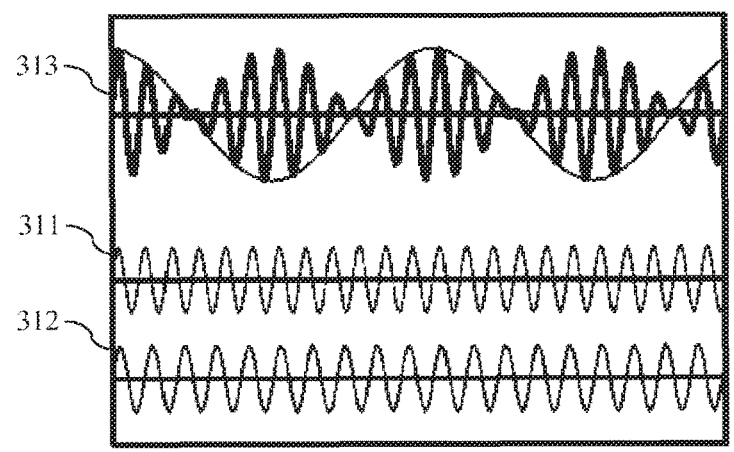
Figure 3C:
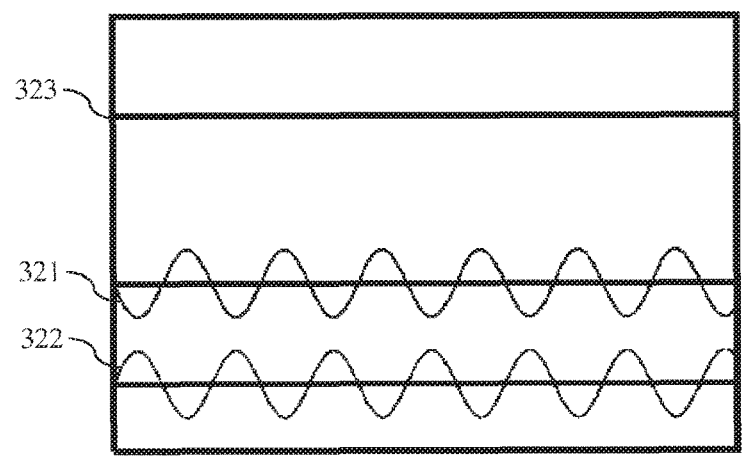

This document describes using the one or more transmitting units 201 of the vehicle 100 to emit compensation signals designed to generate beats by superimposition with the electromagnetic field generated by the charging coils 111, 102 and/or to cancel by destructive interference the electromagnetic field generated by the charging coils 111, 102. The superimposition of exemplary waves is illustrated in FIGS. 3a, 3b and 3c. This shows how the alteration of the frequency and/or of the phase of two waves leads to an amplification or to a damping of the waves. FIG. 3a shows the superimposition of two in-phase waves 301, 302 having the same frequency, which results in an amplified wave 303. A slight frequency deviation between two waves 311, 312 results in a beat 313 (FIG. 3b). On the other hand, the superimposition of two waves 321, 322 having the same frequency but an opposite phase leads to a cancellation 323.

This principle of the superimposition of waves may be used to generate, with the aid of the one or more transmitting units 201, waves 321 which at least partly and/or at least in a specific local region in the vehicle 100 and/or around the vehicle 100 bring about a cancellation 323 of the electromagnetic field 322 generated by the charging coils 111, 102. In other words, the transmitting coils 201 of an access function of the vehicle 100 are used to generate signals in the form of electromagnetic waves which are of opposite polarity to the waves which interfere with the access function. In this case, the transmitting units 201 may generate waves having a Poynting vector magnitude which corresponds to the Poynting vector magnitude of the wave of the charging coils 111, 102. In this regard, a destructive interference may be generated upon a polarity reversal of the wave (i.e. in the case of an opposite phase of the waves 321, 322).

The control unit 202 may be designed to determine one or more properties of the electromagnetic field 322 generated by the charging coils 111, 102. The one or more properties may be in particular a frequency of the generated field 322. Moreover, the one or more properties may include field strength values at different locations in the vehicle 100 and/or in the surroundings of the vehicle 100. The field strength values may be determined for example experimentally in advance and be stored on a storage unit of the vehicle 100. The control unit 202 may be designed to access the storage unit of the vehicle 100 in order to determine the field strength values at one or more locations. The frequency of the interference field 322 may also be stored in the storage unit of the vehicle 100, and thus be made available for the control unit 202.

Typically, the field strength of the interference field 322 in proximity to the charging coils 111, 102 is significantly higher than the field strength of an opposing field 321 which may be generated by a transmitting unit 201. However, the field strength of the interference fie d typically decreases with increasing distance from the charging coils 111, 102, such that in the regions around the vehicle 100 and/or in the interior of the vehicle 100 the interference field 322 has field strength values which may be compensated for by an opposing field 321 generated by a transmitting unit 201.

The control unit 202 may be designed to deter e an electromagnetic field 321 which damps and/or cancels the electromagnetic interference field 322 generated by the charging coils 111, 102 at one or more locations in the vehicle 100 and/or in the surroundings of the vehicle 100. For this purpose, methods may be used which are employed when determining so-called "anti-sound" or in "active noise compensation". In a manner similar to that in the cancellation of sound by destructive interference (on the basis of emitted "opposing sound"), in the present case, too, emission of an electromagnetic opposing field 321 by a transmitting unit 201 makes it possible to damp or cancel the electromagnetic field 322 generated by the charging coils 111, 102 at specific locations.

FIG. 2 illustrates an exemplary region 210 (indicated by the lines) around the transmitting unit 201 in the driver's door of the vehicle 100. The control unit 202 may be designed to determine an opposing field 321 which damps and/or cancels the interference field 322 in said region 210. In particular, the control unit 202 may be designed to instruct the transmitting unit 201 in the driver's door to emit the opposing field 321 determined, and thereby to damp and/or cancel the electromagnetic interference field 322 generated by the charging coils 111, 102 in the region 210. That has the effect that in the region 210 a vehicle key is no longer interfered with by the electromagnetic interference field 322, generated by the charging coils 111, 102, when receiving an enquiry signal.

For providing the access function, the enquiry signal may be superimposed with the c Ring opposing field 321. In other words, the control unit 202 may be designed to determine an electric field and to initiate the emission of the electric field via the transmitting unit 201, wherein the electric field has a first component (i.e. the cancelling opposing field 321), which damps or cancels the electromagnetic 322 generated by the charging coils 111, 102, and wherein the electric field has a second component (i.e. the enquiry signal) in order to provide the access function of the vehicle 100. In other words, both damping/cancellation of the interference field 322 and transmission of information to the vehicle key may be provided by suitable modulation of the signal emitted by the transmitting unit 201.

The above-described damping and/or cancellation of the electromagnetic interference field 322 generated by the charging coils 111, 102 may be carried out by each of the multiplicity of transmitting units 201. In this regard, the interfering field 322 can be eliminated in different regions 210 around the vehicle 100 and/or in the vehicle 100.

The control unit 202 may be designed to adapt the cancelling field 321 generated by a transmitting unit 201, in order, if appropriate, to alter the damped region 210. By way of example, surroundings of the vehicle 100 may be scanned by alteration of the damped region 210, and the surroundings of the vehicle 100 may thus be searched for the vehicle key. As soon as the vehicle key was identified (and thus the position of the vehicle key is also known), the control unit 202 may be designed to adapt the cancelling field 321 generated by a transmitting unit 201 to the position of the vehicle key. In other words, upon a change in the position of the vehicle key, the damped region 210 may be tracked to the changed position of the vehicle key. It is thereby possible to ensure that the vehicle key, after identification for the first time may always be authenticated reliably (i.e. without interference) as long as the vehicle key does not leave the transmitting/receiving range of the multiplicity of transmitting units 201 of the vehicle 100.

The use of transmitting units 201 which are already present for providing the access function in the vehicle 100 was proposed in association with FIG. 2. Alternatively or supplementarily, transmitters provided exclusively for generating the cancelling field 321 may be used. The transmitters may be interlinked with one another (if appropriate via the control unit 202) in order to enable a coordinated damping/cancellation of the field 322 in different regions 210.

Furthermore, it should be pointed out that the generation of cancelling fields 321 may also be used to shield other components of the vehicle 100 and/or components of neighboring vehicles 100 from the interference field 322 generated by the inductive charging. Alternatively or supplementarily, the generation of cancelling fields 321 may be used to shield the vehicle 100 from interfering fields 322 generated by neighboring vehicles. For this purpose, the vehicle 100 may include suitable devices (e.g. sensors) in order to measure a field strength and/or a frequency of the interfering field 322.

Figure 4:
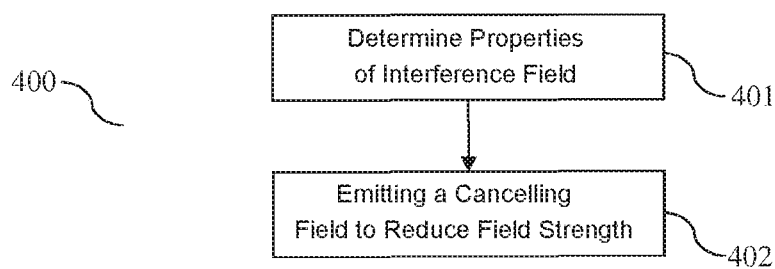
FIG. 4 is a flow diagram of an exemplary method for locally reducing an electromagnetic field generated by inductive charging.

FIG. 4 shows a flow diagram of an exemplary method 400 for neutralizing an electromagnetic interference field 322 caused by the inductive charging of a vehicle 100. The method 400 includes the act of determining 401 one or more properties of the interference field 322. Furthermore, the method 400 further includes the act of emitting 402 an opposing field 321, i.e. a cancelling field, which reduces a field strength of the interference field 322 in a first region 210 around and/or in the vehicle 100.

The present document has described a method and a corresponding device by which the electromagnetic field 322 generated during inductive charging can be neutralized. This ensures that other components of a vehicle 100 function without restriction even during the inductive charging. In particular, undesired interference and/or stray signals may be reduced and/or cancelled. The described methods and/or devices may be provided in a cost-effective manner (if appropriate by software) since recourse may be had to already existing transmitting units 201.

It should be pointed out that the method described in this document may also be used for neutralizing interference fields caused by other power electronic components of a vehicle. Both passive neutralization by destructive interference, e.g. by reflections, and active neutralization by the multiplicity of transmitting units of the vehicle described in this document may thus be made possible. For this purpose, the control unit may be designed to determine one or more properties of an electromagnetic interference field caused by power electronics of the vehicle. Furthermore, the control unit may be designed to cause a transmitting unit of the vehicle to emit an opposing field which reduces a field strength of the interference field in a first region around and/or in the vehicle, The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a vehicle, wherein the control unit is operatively configured to:
   determine one or more properties of an electromagnetic interference field; and
   cause a transmitting unit of the vehicle to emit an opposing field which reduces a field strength of the interference field in a first region around and/or in the vehicle;
   wherein the control unit is operatively configured to determine the opposing field in such a way that a destructive interference results from a superimposition of the opposing field with the interference field in the first region.

2. The control unit as claimed in claim 1, wherein:
   the vehicle is designed to provide an access function,
   the access function comprises an exchange of authentication signals between the vehicle and a vehicle-external authentication unit,
   the transmitting unit is designed to transmit a signal to the authentication unit, and
   the interference field interferes with one of the authentication signals.

3. The control unit as claimed in claim 2, wherein the control unit is operatively configured to cause the transmitting unit to emit a superimposition of the opposing field and an authentication signal.

4. The control unit as claimed in claim 1, wherein the one or more properties of the interference field comprise one or more of: a frequency of the interference field, and one or more field strength values of the interference field at corresponding one or more locations around and/or in the vehicle.

5. The control unit as claimed in claim 1, wherein:
   the one or more properties are predefined and are stored on a storage unit of the vehicle, and
   the control unit is operatively configured to access the storage unit in order to determine the one or more properties of the interference field.

6. The control unit as claimed in claim 1, wherein the vehicle comprises a charging coil which causes the electromagnetic interference field.

7. A control unit for a vehicle, wherein the control unit is operatively configured to:
   determine one or more properties of an electromagnetic interference field;
   cause a transmitting unit of the vehicle to emit an opposing field which reduces a field strength of the interference field in a first region around and/or in the vehicle; and
   alter the opposing field in order to reduce the interference field in a second region around and/or in the vehicle, wherein the second region comprises at least one location around and/or in the vehicle which is not contained in the first region.

8. The control unit as claimed in claim 1, wherein:
the vehicle comprises a multiplicity of transmitting units at different locations of the vehicle, and
the control unit is operatively configured to cause the multiplicity of transmitting units to emit a corresponding multiplicity of opposing fields which reduce the field strength of the interference field in a corresponding multiplicity of regions.

9. A method for neutralizing an electromagnetic interference field in and/or around a vehicle, wherein the method comprises the acts of:
determining one or more properties of the interference field; and
emitting an opposing field which reduces a field strength of the interference field in a first region around and/or in the vehicle;
wherein the opposing field is determined in such a way that a destructive interference results from a superimposition of the opposing field with the interference field in the first region.

\* \* \* \* \*